(12) United States Patent
Kawauchi et al.

(10) Patent No.: US 8,973,892 B2
(45) Date of Patent: Mar. 10, 2015

(54) LOCKING MECHANISM FOR VALVE DEVICE

(75) Inventors: Hideki Kawauchi, Tochigi (JP);
Yukinobu Sakata, Tochigi (JP);
Takahiro Sasaki, Utsunomiya (JP);
Takuya Wakabayashi, Wako (JP)

(73) Assignees: Keihin Corporation, Tokyo (JP);
Honda Motor Co., Ltd., Tokyo (JP)

( * ) Notice: Subject to any disclaimer, the term of this patent is extended or adjusted under 35 U.S.C. 154(b) by 441 days.

(21) Appl. No.: 13/435,416

(22) Filed: Mar. 30, 2012

(65) Prior Publication Data
US 2012/0248349 A1    Oct. 4, 2012

(30) Foreign Application Priority Data

Mar. 31, 2011 (JP) ................ 2011-077338

(51) Int. Cl.
*F16K 31/44* (2006.01)
*H01M 8/04* (2006.01)

(52) U.S. Cl.
CPC ............ *H01M 8/04089* (2013.01); *Y02E 60/50* (2013.01)
USPC ............... 251/75; 251/89; 251/250; 251/296; 251/297; 137/383

(58) Field of Classification Search
CPC ....... F16K 31/54; F16K 35/02; F16K 35/027; F16K 35/04
USPC ................ 251/75, 89–110, 250, 296, 297; 137/383

See application file for complete search history.

(56) References Cited

U.S. PATENT DOCUMENTS 2,693,825 A * 11/1954 Carr .................... 137/630.15
2,753,889 A * 7/1956 Carr et al. ............ 137/630.15

FOREIGN PATENT DOCUMENTS

JP    2007-024242 A    2/2007
JP    2011-075069 A    4/2011

* cited by examiner

*Primary Examiner* — Marina Tietjen
(74) *Attorney, Agent, or Firm* — Westerman, Hattori, Daniels & Adrian, LLP (57) ABSTRACT

A locking mechanism for a valve device, which includes a valve body for opening and closing a fluid path, for retaining the valve body at a predetermined opening position, the valve device further including a gear wheel to which rotational driving force of a rotational driving source is transmitted and a rack section having rack teeth provided thereon for meshing engagement with the gear wheel and configured to convert rotational movement of the gear wheel into linear movement and move together with the valve body. The locking mechanism for a valve device includes: a ball abuttable with a wall face of the rack section; and a spring member configured to press the ball toward the wall face; the valve body being retained by frictional force generated when the ball is pressed against the wall face of the rack section.

12 Claims, 4 Drawing Sheets

LOCKING MECHANISM FOR VALVE DEVICE

CROSS REFERENCES TO RELATED APPLICATIONS

The present disclosure contains subject matter related to that disclosed in Japanese Priority Patent Application JP 2011-077338 filed in the Japan Patent Office on Mar. 31, 2011, the entire contents of which is hereby incorporated by reference.

FIELD OF THE INVENTION

This invention relates to a locking mechanism for a valve device, and more particularly to a locking mechanism for retaining a valve body of a valve device, whose valve body is configured to open and close a fluid path, at a predetermined opening position.

BACKGROUND OF THE INVENTION

A fluid controlling valve device incorporated in a secondary air supplying system which introduces, upon starting up of an engine, secondary air generated in a secondary air flow path pipe into a three way catalytic converter to promote warming up of the three way catalyst is known and disclosed in Japanese Patent Laid-Open No. 2007-24242.

The fluid controlling valve device includes an electric motor, a speed reducing mechanism for reducing the speed of rotation of the electric motor, and a valve shaft or valve rod having a plurality of rack teeth for meshing with a final gear wheel in the speed reducing mechanism and configured to convert the rotational motion of the final gear wheel into linear motion and be displaced integrally with a valve body. In this instance, the electric motor is rotated forwardly or reversely to place the final gear wheel and the rack teeth into meshing engagement with each other to displace the valve body integrally with the valve shaft having the rack teeth to open and close the fluid path.

Meanwhile, a valve device is proposed in Japanese Patent Application No. 2009-229065. In the valve device, a rockable lock lever is provided on a case of the valve device and an engaging portion is formed on a rear face of the rack member, on which the rack teeth are provided, on the opposite side to the rack teeth such that the lock lever is engaged with the engaging portion to retain the valve body, which moves together with the rack member without energization of a rotational driving source, at an open position, that is, at a valve opening position.

SUMMARY OF THE INVENTION

However, a valve device wherein the lock lever is engaged with the engaging portion of the rack member to retain the valve body at the open position has a subject that, when the valve body is displaced from the open position to the closed position, a special driving mechanism such as a solenoid is required in order to disengage the lock lever, to which rotational force is applied in an engaging direction thereof with the engaging portion by a spring member, from the engaging portion.

Further, the rotational force in the engaging direction by the spring member is high in comparison with thrust of the driving mechanism such as a solenoid. Therefore, when the lock lever is to be disengaged from the engaging portion, it has to be driven by the driving mechanism such as a solenoid after the rack member is moved in the valve opening direction once to establish a state in which an end of the lock lever does not contact with the engaging portion. Accordingly, upon valve closure, a useless operation stroke of moving the rack member in the valve opening direction once is involved. As a result, it is necessary for the operation stroke of the rack member to be rather great.

A locking mechanism is provided for a valve device which can retain a valve body at a predetermined opening position without energization of a rotational driving source and does not require a special driving mechanism for canceling the retention of the valve body at the predetermined opening position.

There is provided a locking mechanism for a valve device, which includes a valve body for opening and closing a fluid path, for retaining the valve body at a predetermined opening position, the valve device further including a gear wheel to which rotational driving force of a rotational driving source is transmitted and a rack section having rack teeth provided thereon for meshing engagement with the gear wheel and configured to convert rotational movement of the gear wheel into linear movement and move together with the valve body, the locking mechanism for a valve device including a ball abuttable with a wall face of the rack section, and a spring member configured to press the ball toward the wall face, the valve body being retained by frictional force generated when the ball is pressed against the wall face of the rack section.

In the locking mechanism for a valve device, the ball is pressed against the wall face of the rack section by the spring member, whereupon frictional force is generated between the wall face of the rack section and the ball, and the rack section is retained by the frictional force. Accordingly, even if the rotational driving source is not energized, the valve body can be retained at the predetermined opening position, and power consumption is reduced. Besides, since no special driving mechanism is required to cancel the retention of the valve body at the predetermined opening position, the locking mechanism for a valve device can be implemented in a simple structure, and reduction in size and weight and reduction in cost can be anticipated.

In other words, with the locking mechanism for a valve device, the valve body can be retained at the predetermined opening position without energization of the rotational driving source, and no special driving mechanism is required for canceling the retention of the valve body at the predetermined opening position.

Preferably, the locking mechanism for a valve device further includes a retainer having a retaining face facing in a first direction along an axial direction towards a spring member side and configured to retain the ball at the retaining face thereof, and a pusher having an abutting face having an outer diameter gradually decreasing toward a second direction, opposite to the first direction, and configured for abutment by the ball and a spring receiving face facing in the first direction and configured to receive the biasing force in the second direction of the spring member.

In the locking mechanism for a valve device, the biasing force applied to the spring receiving face of the pusher by the spring member is transmitted to the ball through the abutting face of the pusher, and the pressing force is applied from the ball to the wall face of the rack section. By such a compact configuration as just described, frictional force can be generated between the wall face of the rack section and the ball to retain the rack section.

In this instance, the locking mechanism for a valve device may be configured such that the abutting face of the pusher exhibits a tapering shape in which the outer diameter decreases linearly toward the second direction, and a plurality of such balls are retained by the retainer in a circumferential direction of the abutting face of the pusher.

In the locking mechanism for a valve device, the biasing force of the spring member can be distributed to the plural balls by the abutting face of a simple shape. Accordingly, the frictional force is generated at a number of locations equal to the number of balls between the wall face of the rack section and the balls. Consequently, since the wall face of the rack section is retained stably at the plural locations on a circumference, the rack section can be retained with a higher degree of certainty.

Also, the retainer may have a coming off preventing portion provided thereon for preventing the ball from coming off outwardly in radial directions of the retainer.

In the locking mechanism for a valve device, even if the rack section is moved in the axial direction such that the wall face thereof is spaced away from the ball, a situation such that the ball jumps out in a radially radial direction is prevented.

Further, the locking mechanism for a valve device may be configured such that the pusher has a movement restricting portion provided thereon for abutting with the retainer to restrict movement of the pusher in the second direction, and in a state in which the movement restricting portion abuts with the retainer, the ball is restricted in position by the abutting face of the pusher and projects outwardly in a radial direction of the retainer by a predetermined amount such that, when the rack section is moved to a position at which the wall face thereof opposes to the balls, the ball presses the wall face.

In the locking mechanism for a valve device, when the rack section is moved in the second direction such that it is spaced away from the ball, the pressing force can be prevented from being applied from the pusher to the ball, and the ball is prevented from being acted upon by an unnecessary load. On the other hand, when the rack section is moved in the first direction to a position at which the wall face thereof is opposed to the ball, the ball which projects outwardly by the predetermined amount is abutted with and moved inwardly by the wall face of the rack section. Thereupon, the pusher is pressed by the ball and moves in the first direction against the biasing force of the spring member. Therefore, the pressing force can be applied with certainty from the ball to the wall face of the rack section.

The locking mechanism for a valve device may be configured such that, when the retention of the valve body is to be canceled, rotational driving force for overcoming the frictional force is generated by the rotational driving source.

In the locking mechanism for a valve device, only by causing the rotational driving source to generate the rotational driving force for overcoming the frictional force, the retention of the valve body at the predetermined opening position can be canceled without the necessity for a special driving mechanism. Further, upon valve closure, only it is necessary to move the rack section in the valve closing direction, and a useless operation stroke for moving the rack section in the valve opening direction once is not involved.

The retaining force for retaining the valve body at the predetermined opening position may be set by a spring load to said spring member.

In the locking mechanism for a valve device, the retaining force for retaining the valve body at the predetermined opening position can be adjusted by changing the spring load to the spring member.

In summary, with locking mechanism for a valve device, the valve body can be retained at the predetermined opening position without energization of the rotational driving source, and no special driving mechanism is required for canceling the retention of the valve body at the predetermined opening position.

The above and other objects, features and advantages of the present invention will become apparent from the following description and the appended claims, taken in conjunction with the accompanying drawings in which like parts or elements denoted by like reference characters.

DETAILED DESCRIPTION OF THE INVENTION

In the following, a preferred embodiment of the present invention is described in detail with reference to the accompanying drawings.

Figure 1:
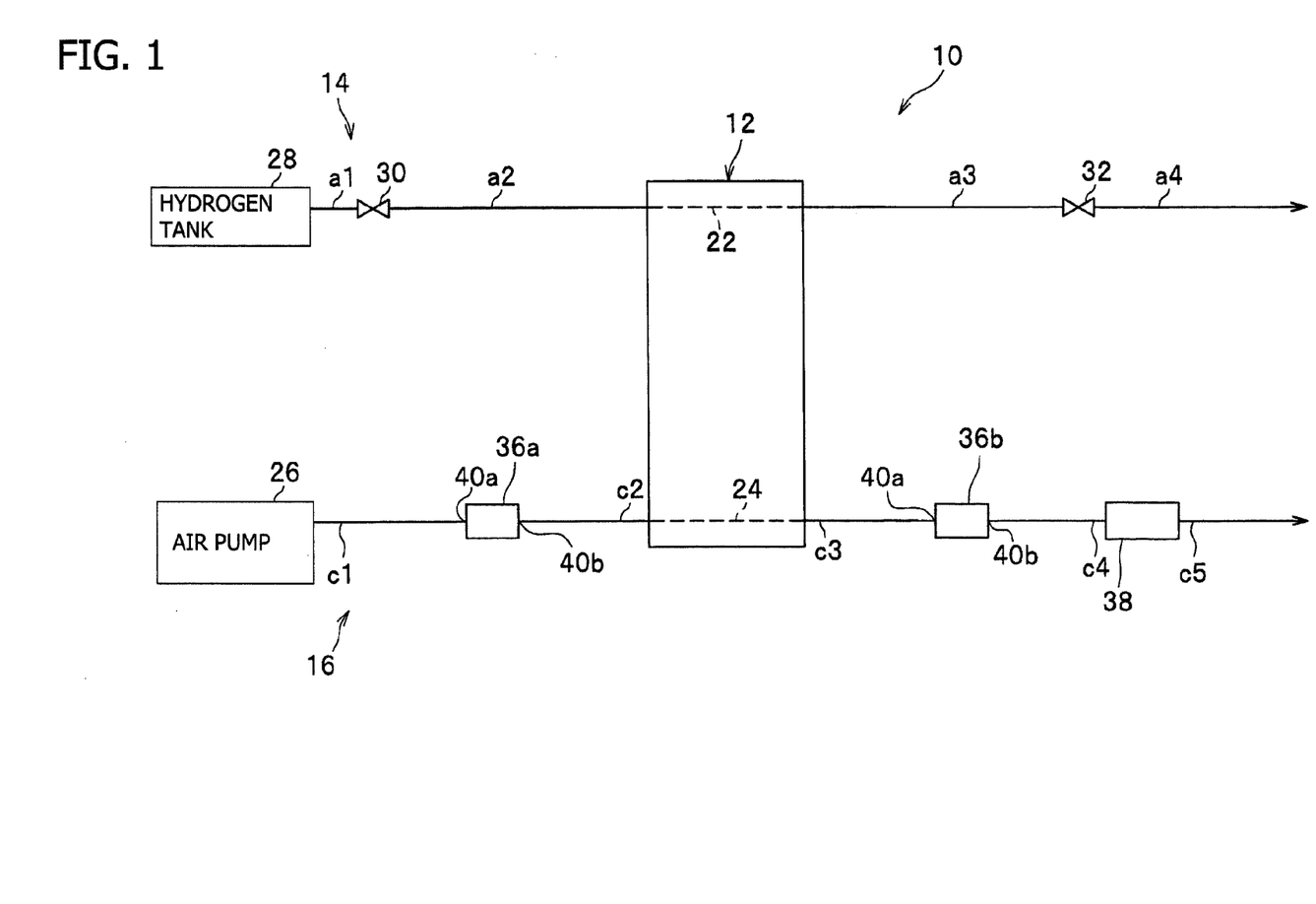
FIG. 1 is a diagrammatic view showing a general configuration of a fuel cell system to which a locking mechanism for a valve device is applied.

FIG. 1 shows a general configuration of a fuel cell system to which a locking mechanism for a valve device according to an embodiment of the present invention is applied. It is to be noted that, although the following description of the present embodiment is directed to a valve device incorporated in a fuel cell mounted on a vehicle as an example, the present invention is not limited to this, but can be applied to various valve devices incorporated in fuel cells for use, for example, with ships, aircrafts and so forth or fuel cells of the stationary type for business use and for domestic use.

Referring to FIG. 1, the fuel cell system 10 to which the locking mechanism for a valve device according to the present embodiment is applied includes a fuel cell 12, an anode system 14, a cathode system 16, a control system (not shown) and so forth.

The fuel cell 12 is formed from a solid polymer electrolyte fuel cell (PEFC) and configured from a plurality of single cells layered with each other and each including a MEA (Membrane Electrode Assembly) sandwiched by separators not shown. The MEA includes an electrolyte film, that is, a solid polymer film, a cathode and an anode which sandwich the electrolyte film therebetween, and so forth. The cathode and the anode are formed, for example, from an electrode catalyst layer wherein catalyst such as platinum is carried by a catalyst carrier such as carbon black. Meanwhile, in each of the separators, an anode flow path 22 and a cathode flow path 24 each in the form of a groove or a through-hole are formed.

In the fuel cell 12 having such a configuration as described above, if hydrogen as reaction gas or fuel gas is supplied to the anode and the air as reaction gas or oxidant gas containing oxygen is supplied to the cathode, then an electrode reaction occurs on the catalyst contained in the anode and the cathode, and the fuel cell 12 enters a state in which it can generate power.

The fuel cell 12 is electrically connected to an external load (not shown) and generates power if current is extracted from the fuel cell 12 by the external load. It is to be noted that the external load may be a motor for traveling, an electrical storage device such as a battery or a capacitor, an air pump 26 hereinafter described, and so forth.

The anode system 14 is configured from a hydrogen tank 28, a cutoff valve 30, a purge valve 32, pipes a1 to a4, and so forth.

The hydrogen tank 28 stores hydrogen of a high purity in a high pressure condition and is connected to the cutoff valve 30 on the downstream side through the pipe a1. The cutoff valve 30 is configured, for example, from a solenoid valve and is connected to the entrance of the anode flow path 22 of the fuel cell 12 on the downstream side through the pipe a2.

The purge valve 32 is configured, for example, from a solenoid valve and connected to the exit of the anode flow path 22 of the fuel cell 12 on the upstream side through the pipe a3.

The cathode system 16 is configured from an air pump 26, valve devices 36a and 36b, a back pressure valve 38, pipes c1 to c5 serving as oxidant gas flow paths, and so forth.

The air pump 26 is, for example, a mechanical supercharger driven by a motor (not shown), and compresses and supplies external air of gas taken therein to the fuel cell 12.

The valve device 36a is provided on the supply side of oxidant gas and is connected to the air pump 26 on the upstream side through the pipe c1 and connected to the entrance of the cathode flow path 24 of the fuel cell 12 on the downstream side through the pipe c2. Meanwhile, the valve device 36b is provided on the discharge side of oxidant gas and is connected to the exit of the cathode flow path 24 of the fuel cell 12 on the upstream side through the pipe c3 and connected to the back pressure valve 38 on the downstream side through the pipe c4.

The two valve devices 36a and 36b are of the normally closed type and have the same configuration. Therefore, the configuration of the valve device 36a is described in detail while description of the valve device 36b is omitted herein.

Figure 2:
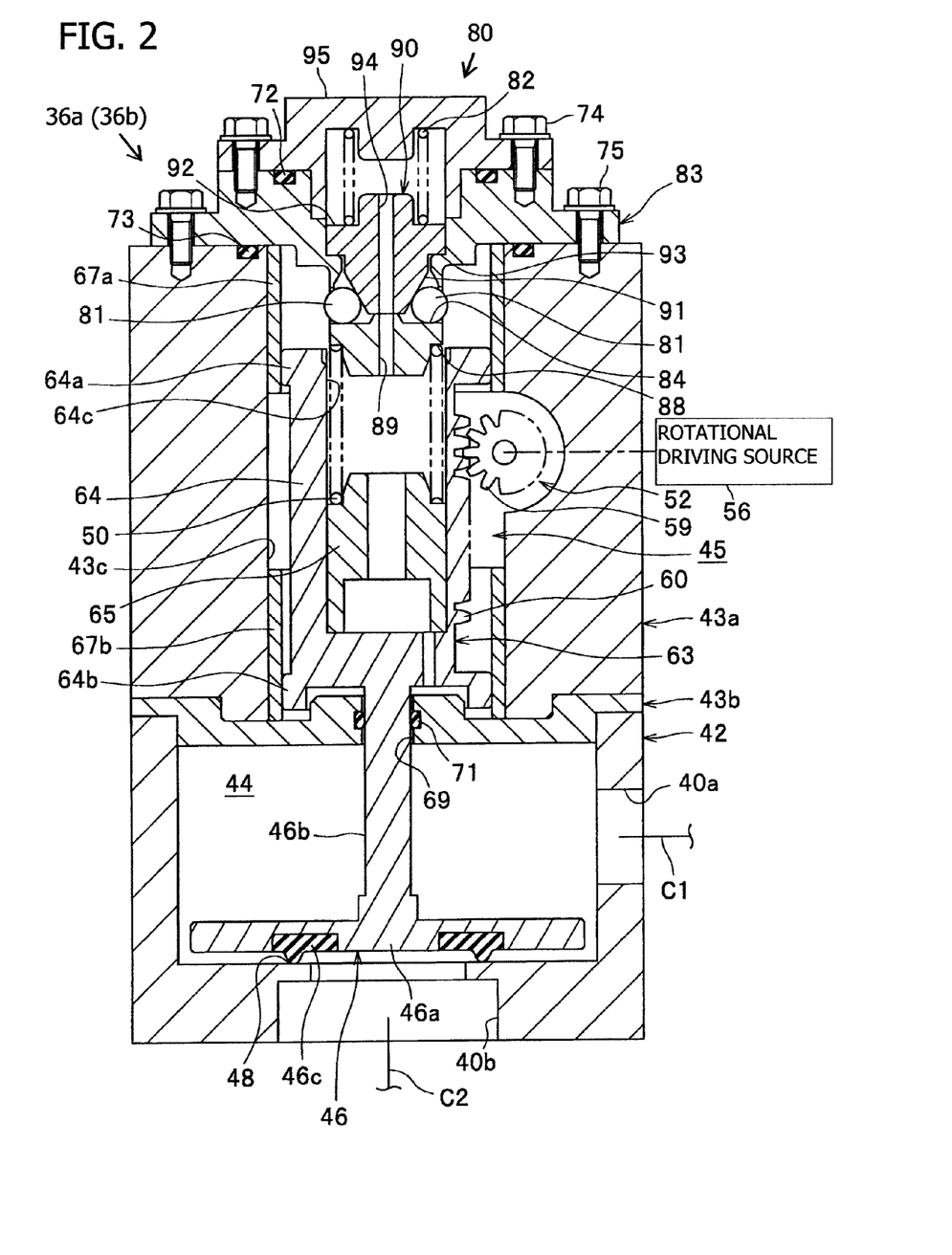
FIG. 2 is a schematic vertical sectional view of the valve device incorporated in the fuel cell system.

FIG. 2 shows a schematic vertical sectional view of a valve device incorporated in the fuel cell system.

Referring to FIG. 2, the valve device 36a includes a valve housing 42 having a side wall in which an inlet port 40a into which fluid, that is, pressure fluid, is introduced is formed and a bottom wall in which an outlet port 40b from which fluid, that is, pressure fluid, exits. The valve device 36a further includes a gear case 43a mounted on the upper side of and integrally coupled to the valve housing 42, and an intermediate plate 43b interposed between the valve housing 42 and the gear case 43a. It is to be noted that the valve housing 42, gear case 43a and intermediate plate 43b function as a valve main body.

Further, the valve device 36a includes a valve body 46 provided in a chamber 44, which is closed up by the valve housing 42 and the intermediate plate 43b, for changing over the inlet port 40a and the outlet port 40b between a communicating state and a non-communicating state therebetween. The valve device 36a further includes a valve driving mechanism 52 provided in a space region 45 formed on the inner side of the gear case 43a for displacing the valve body 46 along a direction in which the valve body 46 is spaced away from a seat region 48 and another direction in which the valve body 46 is seated on the seat region 48. The valve device 36a further includes a locking mechanism 80 for retaining the valve body 46 at an open position, that is, a valve opening state. Here, the valve body 46 opens and closes a fluid path configured from the pipe c1, pipe c2 and chamber 44 by changing over the inlet port 40a and the outlet port 40b between a communicating state and a non-communicating state therebetween.

The valve body 46 has a valve portion 46a in the form of a disk and a valve rod 46b connected to the center of the valve portion 46a, and a valve packing 46c which abuts with the seat region 48 of the valve housing 42 to exhibit a seal function is mounted on a lower face of the valve portion 46a. It is to be noted that the valve portion 46a and the valve rod 46b are produced separately from each other and configured so as to be assembled integrally by fastening them to each other by means of screws (not shown). However, the valve portion 46a and the valve rod 46b may otherwise be formed integrally.

The valve driving mechanism 52 includes a rotational driving source 56 formed, for example, from a stepping motor or a DC servomotor, a gear wheel 59 to which rotational driving force of the rotational driving source 56 is transmitted, and a rack section 63 having rack teeth 60 provided thereon for meshing engagement with the gear wheel 59 for converting rotational motion of the gear wheel 59 into linear motion thereof and moving together with the valve body 46. It is to be noted that the rotational driving force of the rotational driving source 56 is transmitted to the gear wheel 59 through a speed reduction mechanism (not shown) configured from a plurality of gear wheels.

The rack section 63 has a main body section 64 of a bottomed cylindrical shape and has the valve rod 46b provided at a lower portion of the main body section 64. Here, the rack section 63 is configured so as to be formed integrally with the valve rod 46b and is movable or displaceable integrally with the valve rod 46b. However, the rack section 63 and the valve rod 46b may be produced separately from each other and configured so as to be fastened to each other by screws.

Although the rack section 63 and the valve rod 46b here are disposed such that the center axes thereof are positioned on the same straight line, the configuration of them is not limited to this, but they may be configured otherwise such that the center axes thereof are offset from each other by a predetermined distance as viewed in plan and extend substantially in parallel to each other along the upward and downward direction in a side view.

Increased diameter portions 64a and 64b are formed at the opposite ends in the axial direction of the main body section 64 of the rack section 63. A pair of increased diameter portions 64a and 64b are mounted on an inner face 43c of the gear case 43a such that they slidably contact with outer circumferential faces of the increased diameter portions 64a and 64b thereby to support the rack section 63 for movement in the upward and downward directions. Collars 67a and 67b are each formed, for example, from a member of a cylindrical shape made of sintered metal or the like and function as bearings for supporting the rack section 63 for sliding movement so that tilting movement of the rack section 63 and hence of the valve portion 46a and the valve rod 46b can be blocked to allow a further stabilized seating action to be exhibited.

A spring receiving member 65 of a substantially cylindrical shape is disposed in the inside of the main body section 64 of the rack section 63, and a coil spring 50 is mounted on an upper face of the spring receiving member 65. The coil spring 50 has a function of resiliently pressing the valve body 46 in a direction toward the seat region or valve seat 48 through the spring receiving member 65 by spring force.

The direction of rotation of the gear wheel 59 can be changed over between the forward and reverse directions by changing over the polarity of current to be supplied to the rotational driving source 56. The rotational motion of the gear wheel 59 is converted into linear motion, that is, upward and downward movement, of the rack section 63 through the meshing engagement between the gear wheel 59 and the rack teeth 60. Then, the linear movement of the rack section 63 is transmitted to the valve rod 46b connected to the lower portion of the rack section 63 to displace the valve body 46 along the upward and downward direction. As a result, the valve body 46, particularly the valve portion 46a, is seated on the seat region 48 thereby to close up the outlet port 40b to establish a closed valve state in which the communication between the inlet port 40a and the outlet port 40b is cut off. On the other hand, if the valve body 46 is spaced away from the seat region 48, then an open valve state is established in which the inlet port 40a and the outlet port 40b are communicated with each other through the chamber 44 in the valve housing 42.

The valve rod 46b of the valve body 46 provided continuously to the rack section 63 is fitted in a fitting hole 69 formed in the intermediate plate 43b. A seal member 71, for example, an O-snap ring for retaining the space region 45 of the gear case 43a and the chamber 44 of the valve housing 42 in a liquid-tight and air-tight relationship is provided in the fitting hole 69.

Now, the locking mechanism 80 is described.

The locking mechanism 80 includes a ball 81 capable of abutting with a wall face 64c which is an inner circumferential face of the main body section 64 of the rack section 63, and a spring member 82 such as a coil spring for resiliently pressing the ball 81 toward the wall face 64c. The locking mechanism 80 retains the valve body 46 in the open position by frictional force generated when the ball 81 is pressed against the wall face 64c of the rack section 63.

Further, the locking mechanism 80 includes a retainer 83 for retaining the ball 81. The retainer 83 has a retaining face 84 facing in a first direction, which is an upward direction in FIG. 2, along an axial direction on the spring member 82 side, and retains the ball 81 at the retaining face 84 thereof Here, the first direction is an opposite direction to the valve body 46 as viewed from the retainer 83.

Here, four such balls 81 are retained by the retainer 83. However, the number of balls to be disposed can be set arbitrarily. The balls 81 may be formed, for example, from a steel ball.

FIGS. 3A to 3D show the retainer for retaining the balls.

Referring to FIGS. 3A to 3D, the retainer 83 exhibits a shape of a circular lid which is recessed at a central portion thereof, and a ball accommodating chamber 85 for accommodating the balls 81 (refer to FIG. 2) is formed on the bottom of the recessed portion of the retainer 83. A side wall portion 86 of a cylindrical shape of the ball accommodating chamber 85 has four flat face portions 86a formed at equal distances on a circumferential line thereof by flattening work.

At each of the four flat face portions 86a, a hole 87 is perforated along a radial direction by a working tool such as a drill. Part, that is, a lower portion in FIG. 3D, of an inner circumferential face of the hole 87 forms a retaining face 84 for retaining a ball 81. To form the flat face portions 86a is preferable because the outwardly projecting amount of the balls 81 from the retainer 83 becomes great to make it easy to press the balls 81 against the wall faces 64c of the rack section 63. Further, since the retaining faces 84 exhibit a grooved shape corresponding to part of the cylindrical side face, they can retain the balls 81 stably. It is to be noted that the number of the flat face portions 86a and the retaining faces 84 is set so as to be equal to the number of balls 81 to be disposed.

The diameter of the hole 87 is set smaller than the diameter of the balls 81 as seen in FIG. 2. Accordingly, an opening end portion of the hole 87 functions as a coming off preventing portion 87a for preventing the ball 81 from coming off outwardly in a radial direction of the retainer 83. With such a configuration as just described, even if the rack section 63 is moved in an axial direction so that the wall face 64c shown in FIG. 2 thereof is spaced away from the ball 81, the ball 81 can be prevented from coming off outwardly in a radial direction.

Further, a spring receiving face 88 for receiving an upper end of the coil spring 50 shown in FIG. 2 is formed at a lower portion of the retainer 83. In particular, the coil spring 50 is mounted between the retainer 83 and the spring receiving member 65 shown in FIG. 2. It is to be noted that reference numeral 89 in FIGS. 3A to 3D denotes an air hole through which the air is circulated.

Referring back to FIG. 2, the locking mechanism 80 includes a pusher 90 having an abutting face 91 having an outer diameter gradually decreasing in a second direction opposite to the first direction, that is, in a downward direction in FIG. 2, and is configured for abutment by the balls 81. Here, the abutting face 91 has a simple shape in that it exhibits a tapering shape, that is, a conical side face shape, whose outer diameter linearly decreases in the downward direction. However, the abutting face 91 may otherwise have a substantially semispherical shape or the like.

The pusher 90 has a spring receiving face 92 which faces in the first direction, that is, in the upward direction, for receiving biasing force in the second direction, that is, in the downward direction, of the spring member 82. The pusher 90 converts the downward biasing force of the spring member 82 into force acting outwardly in radial directions. It is to be noted that reference numeral 94 in FIG. 2 denotes an air hole through which the air is communicated.

Further, the pusher 90 has a movement restricting portion 93 provided thereon for abutting with the retainer 83 to restrict movement of the pusher 90 in the second direction, that is, in the downward direction. In a state in which the movement restricting portion 93 abuts with the retainer 83, when the rack section 63 is moved to a position at which the wall face 64c thereof opposes the balls 81, the balls 81 are restricted in position by the abutting face 91 of the pusher 90 and project outwardly in radial directions of the retainer 83 by a predetermined amount so as to press the wall face 64c.

The locking mechanism 80 further includes a spring holder 95 for receiving an upper end of the spring member 82. In other words, the spring member 82 is mounted between the pusher 90 and the spring holder 95 and biases the pusher 90 in the downward direction.

Figure 3A:
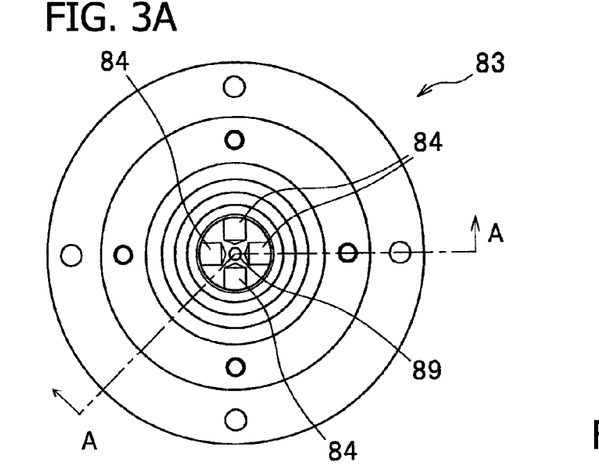
FIGS. 3A, 3B, 3C and 3D are a top plan view, a front elevational view, a bottom plan view and a sectional view taken along line A-A of FIG. 3A, respectively, showing a retainer for retaining a ball.
Figure 3B:
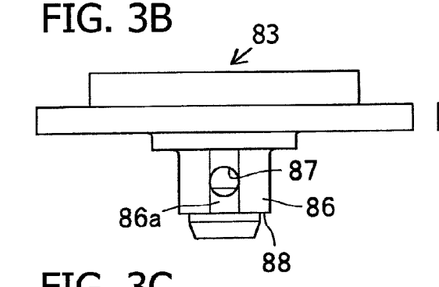
Figure 3C:
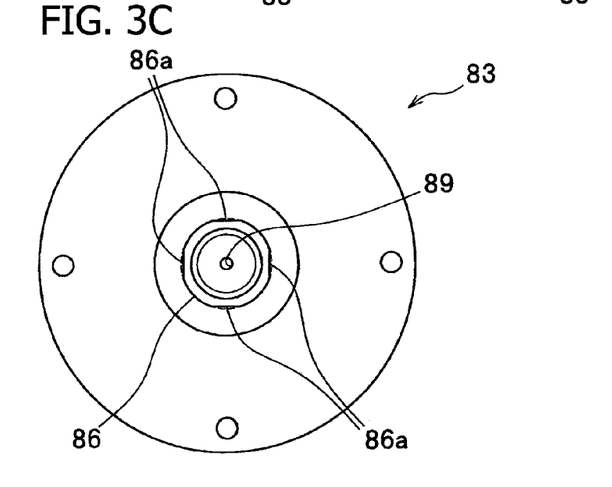
Figure 3D:
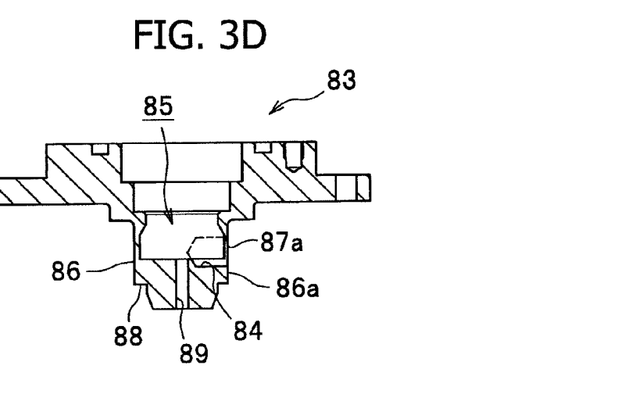

The spring holder 95 is secured to an upper face of the retainer 83 by screw members 74, and the spring holder 95 and the retainer 83 are sealed from each other by a seal member 72. Further, the retainer 83 is secured to an upper face of the gear case 43a by screw members 75, and the retainer 83 and the gear case 43a are sealed from each other by another seal member 73. It is to be noted that the number of fastening locations by the screw members 74 and 75 is not limited to four as seen in FIG. 3A, but can be changed suitably.

The retainer 83, pusher 90 and rack section 63 abutted by the balls 81 are formed from a metal material such as, for example, iron or steel and are preferably formed by wholly or partly applying a surface hardening process such as heat treatment so as to have a predetermined hardness so that they are not damaged even if the balls 81 are pressed thereagainst.

The locking mechanism 80 of the valve device 36a configured in such a manner as described above operates in the following manner.

Figure 4A:
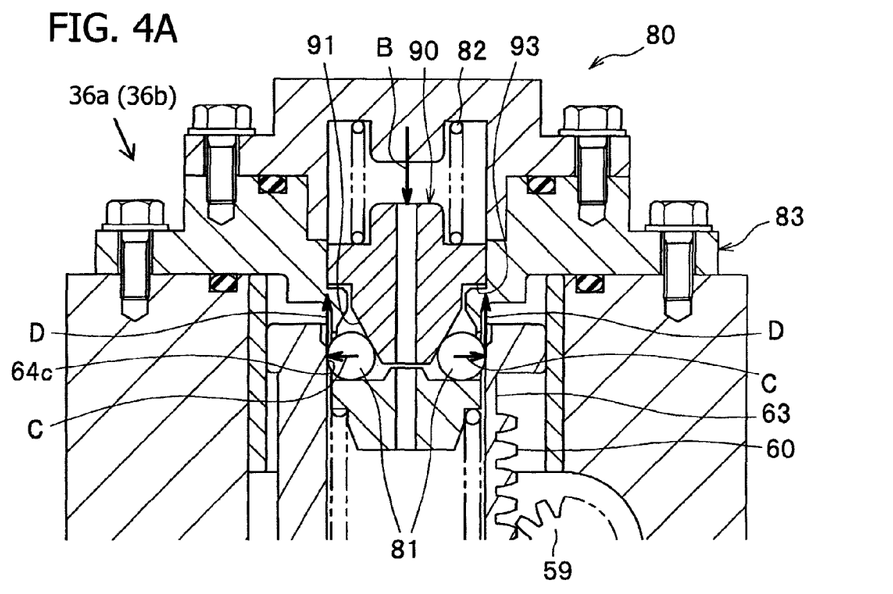
FIG. 4A is a schematic vertical sectional view illustrating operation of the locking mechanism of the valve device in an open valve state.
Figure 4B:
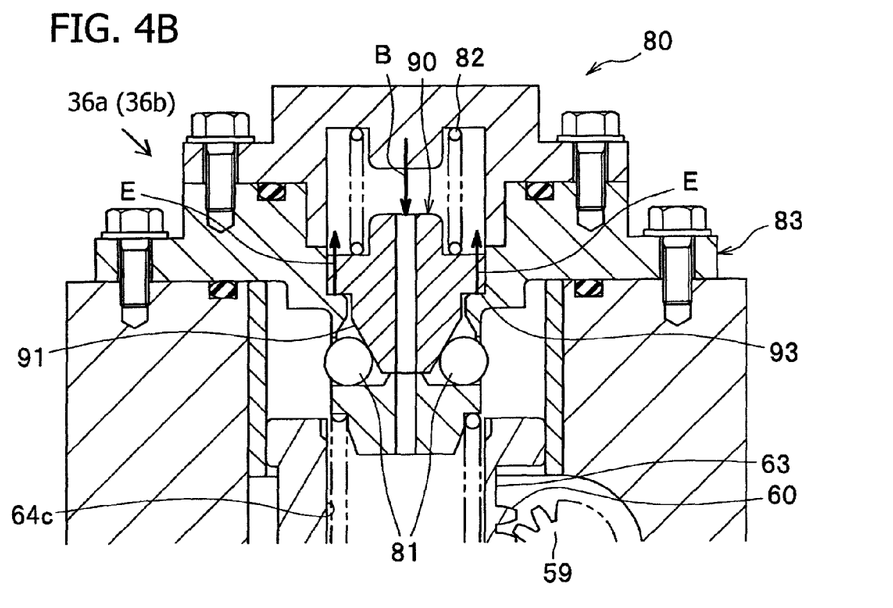
FIG. 4B is a similar view but illustrating operation of the locking mechanism of the valve device in a closed valve state after the open valve state is canceled.

FIGS. 4A and 4B illustrate operation of the locking mechanism for a valve device, and particularly FIG. 4A shows the locking mechanism in an open valve state while FIG. 4B shows the locking mechanism in a closed valve state after the open valve state is canceled.

First, transition to the open valve state is described with reference to FIG. 4A.

If the rack section 63 moves in the valve opening direction, that is, in the upward direction, by rotation of the gear wheel 59 as seen in FIG. 4A, then the balls 81 are brought into contact with the wall face 64c of the rack section 63 and moved inwardly in radial directions of the retainer 83. Here, a gap in a radial direction exists between the retainer 83 and the wall face 64c of the rack section 63, and only the balls 81 contact with the wall face 64c of the rack section 63.

When the balls 81 are moved inwardly in radial directions by the contact between the wall face 64c of the rack section 63 and the balls 81, the balls 81 are brought into contact with the abutting face 91 of the pusher 90 to move the pusher 90 in the upward direction, whereupon the spring member 82 is compressed.

The biasing force B of the spring member 82 when it is compressed is converted into outward force in radial directions by the tapering abutting face 91 of the pusher 90, which acts as pressing force C for pressing the balls 81 against the wall face 64c of the rack section 63.

By this pressing force C, frictional force D is generated between the balls 81 and the wall face 64c of the rack section 63. The frictional force D is generated at a number of locations equal to the number of the balls 81 at the contact points between the balls 81 and the wall face 64c of the rack section 63. Accordingly, since the wall face 64c of the rack section 63 is stably retained at the plural locations on a circumference, the rack section 63 can be retained with certainty. At this time, the force for retaining the rack section 63 is calculated by an expression of the force for retaining the rack section 63=frictional force D×contact number (number of the balls 81). In this manner, even if the rotational driving source 56 shown in FIG. 2 is not energized, the rack section 63 and hence the valve body 46 shown in FIG. 2 can be retained at the open position.

Here, the retaining force for retaining the valve body 46 shown in FIG. 2 at the open position is set by the spring load to the spring member 82. Accordingly, the retaining force for retaining the valve body 46 at the open position can be adjusted by changing the spring load to the spring member 82.

Now, cancellation of the open valve state is described with reference to FIG. 4B.

As seen in FIG. 4B, cancellation of the open valve state is carried out by moving the rack section 63 in the valve closing direction, that is, in the downward direction, by rotation of the gear wheel 59. At this time, in the valve device 36a, the rotational driving source 56 shown in FIG. 2 generates rotational driving force for overcoming the sum total of the frictional force D for retaining the rack section 63. By causing the rotational driving source 56 shown in FIG. 2 to generate the rotational driving force for overcoming the sum total of the frictional force D in this manner, the open valve state can be canceled without the necessity for a special driving mechanism.

The valve device 36a is placed into the closed valve state by moving the rack section 63 in the valve closing direction, that is, in the downwardly direction, by rotation of the gear wheel 59. In this manner, upon valve closure, only it is necessary to move the rack section in the valve closing direction, and a useless operation stroke for moving the rack section in the valve opening direction once is not involved.

Further, in the closed valve state illustrated in FIG. 4B, since the movement restricting portion 93 of the pusher 90 abuts with the retainer 83, movement of the pusher 90 in the downward direction is restricted. At this time, the biasing force B of the spring member 82 acts upon the retainer 83 through the movement restricting portion 93 and is balanced with reactive force E. Accordingly, when the rack section 63 is moved in the downward direction so as to be spaced away from the balls 81 and the retention is not required any more, the pressing force from the pusher 90 does not act upon the balls 81, and consequently, application of an unnecessary load to the balls 81 can be prevented.

On the other hand, in the state in which the movement restricting portion 93 abuts with the retainer 83, the balls 81 are restricted in position by the abutting face 91 of the pusher 90 and project outwardly in radial directions of the retainer 83 by a predetermined amount. Accordingly, if the rack section 63 is moved in the upwardly direction to a position at which the wall face 64c thereof is opposed to the balls 81, then the balls 81 projecting outwardly by the predetermined amount are abutted with and moved inwardly by the wall face 64c of the rack section 63. Thereupon, the pusher 90 is pressed by the balls 81 to move in the upward direction against the biasing force of the spring member 82. Consequently, the pressing force can be applied from the balls 81 to the wall face 64c of the rack section 63 with certainty.

As described above, the locking mechanism 80 of the valve devices 36a and 36b according to the present embodiment includes the balls 81 abuttable with the wall face 64c of the rack section 63 which moves together with the valve body 46 and the spring member 82 for pressing the balls 81 toward the wall face 64c, and retains the valve body 46 by frictional force generated when the balls 81 are pressed against the wall face 64c of the rack section 63.

With the embodiment having such a configuration as just described, the balls 81 are pressed against the wall face 64c of the rack section 63 by the spring member 82 to cause frictional force to be generated between the wall face 64c of the rack section 63 and the balls 81 such that the rack section 63 and hence the valve body 46 are retained by the frictional force. Accordingly, even if the rotational driving source 56 is not energized, the valve body 46 can be retained at the open position, and consequently, power consumption is reduced. Besides, since no special driving mechanism is required in order to cancel the retention of the valve body 46 at the open position, a simple structure can be implemented and reduction in weight and size and reduction in cost can be achieved.

In other words, with the locking mechanism for a valve device, the valve body 46 can be retained at the open position without energization of the rotational driving source 56 and no special driving mechanism is required in order to cancel the retention of the valve body 46 at the open position.

Further, in the present embodiment, the locking mechanism 80 includes the retainer 83 having the retaining face 84 facing in the upward direction and configured to retain the balls 81 by means of the retaining face 84, and the pusher 90 having the abutting face 91 having an outer diameter gradually decreasing in the downward direction for being abutted by the balls 81 and the spring receiving face 92 facing in the upward direction for receiving the biasing force in the downward direction of the spring member 82.

With such a configuration as just described, the biasing force B applied to the spring receiving face 92 of the pusher 90 from the spring member 82 is transmitted to the balls 81 through the abutting face 91 of the pusher 90, whereupon the pressing force C is applied to the wall face 64c of the rack section 63 from the balls 81 (refer to FIG. 4A). By such a compact configuration as just described, the frictional force D (refer to FIG. 4A) can be generated between the wall face 64c of the rack section 63 and the balls 81 to retain the rack section 63.

Further, in the present embodiment, the abutting face 91 of the pusher 90 exhibits a tapering shape having an outer diameter linearly decreasing toward the downward direction, and a plurality of such balls 81 are retained by the retainer 83.

With such a configuration as just described, the biasing force of the spring member 82 can be distributed to the plural balls 81 by the abutting face 91 of a simple shape. Accordingly, since the frictional force is generated at a number of places equal to the number of the balls 81 between the wall face 64c of the rack section 63 and the balls 81, the rack section 63 can be retained with certainty.

While the present invention has been described in connection with the preferred embodiment thereof, the present invention is not limited to the configuration described hereinabove in connection with the embodiment thereof but can be suitably carried out in various modified configurations without departing from the spirit and scope thereof including suitable combinations and selections of the components described in connection with the embodiment.

For example, while the locking mechanism 80 in the embodiment described above is configured such that it can retain the valve body 46 at the open position, it may otherwise be configured such that, for example, the seating portion is provided at a ceiling portion of the valve housing 42 such that the valve body 46 can be retained at the closed position. In this instance, the valve device is of the normally open type. Further, the locking mechanism 80 may be configured otherwise such that the portions of the wall face of the rack section 63 which are acted upon by the pressing force from the balls 81, that is, portions having partially reduced inner diameters, are formed at predetermined positions displaced from each other in the axial direction so that the valve body 46 can be retained at a predetermined opening position.

Further, while, in the embodiment described above, the balls 81 are pressed against the wall face 64c which is an inner circumferential face of the main body section 64 of the rack section 63 to retain the rack section 63, the present invention is not limited to this but may be configured such that the balls 81 are pressed against a wall face which is an outer circumferential face of the main body section 64 of the rack section 63 to retain the rack section 63.

Further, while, in the embodiment described above, the biasing force of the single spring member 82 is distributed to the plural balls 81 by utilizing, for example, the pusher 90 having the abutting face 91 of a tapering shape, the present invention is not limited to this but may be configured otherwise such that a spring member for biasing a ball 81 toward the wall face of the rack section 63 is provided for each of the plural balls 81.

It should be understood by those skilled in the art that various modifications, combinations, sub-combinations and alterations may occur depending on design requirements and other factors insofar as they are within the scope of the appended claims or the equivalents thereof.

We claim:

1. A locking mechanism for a valve device, the valve device including a valve body for opening and closing a fluid path, a gear wheel to which rotational driving force of a rotational driving source is transmitted and a rack section having rack teeth provided thereon for meshing engagement with the gear wheel and configured to convert rotational movement of the gear wheel into linear movement and move together with the valve body, said locking mechanism comprising:
a ball abuttable with a wall face of the rack section; and
a spring member configured to press said ball toward the wall face;
wherein the valve body is retained by frictional force generated when said ball is pressed against the wall face of the rack section,
wherein the locking mechanism is capable of retaining the valve body at a predetermined opening position, and
wherein the locking mechanism further comprising:
a pusher comprising
a spring receiving face facing in a first direction along an axial direction towards the spring member and configured to receive biasing force from the spring member in a second direction opposite to the first direction, and
an abutting face having an outer diameter gradually decreasing toward the second direction and configured for abutment by said ball; and
a retainer comprising a retaining face facing in the first direction and configured to retain said ball at said retaining face thereof.

2. The locking mechanism for a valve device according to claim 1,
wherein the abutting face of said pusher comprises a tapering shape in which the outer diameter decreases linearly in the second direction, and
wherein a plurality of such balls are retained by said retainer in a circumferential direction of the abutting face of said pusher.

3. The locking mechanism for a valve device according to claim 1, wherein said retainer comprises a coming off preventing portion provided thereon for preventing said ball from coming off outwardly in radial directions of said retainer.

4. The locking mechanism for a valve device according to claim 1,
wherein said pusher comprises a movement restricting portion provided thereon for abutting with said retainer to restrict movement of said pusher in the second direction, and
wherein in a state in which said movement restricting portion abuts with said retainer, said ball is restricted in position by the abutting face of said pusher and projects outwardly in radial directions of said retainer by a predetermined amount such that, when the rack section is moved to a position at which the wall face thereof opposes to said ball, said ball presses the wall face.

5. The locking mechanism for a valve device according to claim 1, wherein, when the retention of the valve body is to be canceled, rotational driving force for overcoming the frictional force is generated by the rotational driving source.

6. The locking mechanism for a valve device according to claim 1, wherein the retaining force for retaining the valve body at the predetermined opening position is set by a spring load to said spring member.

7. A valve device, comprising:
a valve body for opening and closing a fluid path,
a gear wheel to which rotational driving force of a rotational driving source is transmitted,
a rack section having rack teeth provided thereon for meshing engagement with the gear wheel and configured to convert rotational movement of the gear wheel into linear movement and move together with the valve body, and
a locking mechanism comprising
a ball abuttable with a wall face of the rack section; and
a spring member configured to press said ball toward the wall face;

wherein the valve body is retained by frictional force generated when said ball is pressed against the wall face of the rack section, wherein the locking mechanism is capable of retaining the valve body at a predetermined opening position, and wherein the locking mechanism further comprising:

a pusher comprising
- a spring receiving face facing in a first direction along an axial direction towards the spring member and configured to receive biasing force from the spring member in a second direction opposite to the first direction, and
- an abutting face having an outer diameter gradually decreasing toward the second direction and configured for abutment by said ball; and a retainer comprising a retaining face facing in the first direction and configured to retain said ball at said retaining face thereof.

8. The valve device according to claim 7, wherein the abutting face of said pusher comprises a tapering shape in which the outer diameter decreases linearly in the second direction, and wherein a plurality of such balls are retained by said retainer in a circumferential direction of the abutting face of said pusher.

9. The valve device according to claim 7, wherein said retainer comprises a coming off preventing portion provided thereon for preventing said ball from coming off outwardly in radial directions of said retainer.

10. The valve device according to claim 7, wherein said pusher comprises a movement restricting portion provided thereon for abutting with said retainer to restrict movement of said pusher in the second direction, and wherein in a state in which said movement restricting portion abuts with said retainer, said ball is restricted in position by the abutting face of said pusher and projects outwardly in radial directions of said retainer by a predetermined amount such that, when the rack section is moved to a position at which the wall face thereof opposes to said ball, said ball presses the wall face.

11. The valve device according to claim 7, wherein, when the retention of the valve body is to be canceled, rotational driving force for overcoming the frictional force is generated by the rotational driving source.

12. The valve device according to claim 7, wherein the retaining force for retaining the valve body at the predetermined opening position is set by a spring load to said spring member.

* * * * *